US012497810B2

(12) United States Patent
Geller

(10) Patent No.: US 12,497,810 B2
(45) Date of Patent: Dec. 16, 2025

(54) FITTING FOR THE MOVABLE MOUNTING OF A PIVOT ELEMENT RELATIVE TO A STATIONARY SUPPORT

(71) Applicant: Julius Blum GmbH, Hoechst (AT)

(72) Inventor: Irmela Mara Geller, Dornbirn (DE)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/647,765

(22) Filed: Apr. 26, 2024

(65) Prior Publication Data

US 2024/0271473 A1 Aug. 15, 2024

Related U.S. Application Data

(63) Continuation of application No. PCT/AT2022/060354, filed on Oct. 13, 2022.

(30) Foreign Application Priority Data

Nov. 26, 2021 (AT) .............................. A 50950/2021

(51) Int. Cl.
*E05D 7/10* (2006.01)
*A47B 95/00* (2006.01)
*E05D 11/10* (2006.01)

(52) U.S. Cl.
CPC .......... *E05D 11/1021* (2013.01); *A47B 95/00* (2013.01); *E05D 11/1007* (2013.01); *E05Y 2900/20* (2013.01)

(58) Field of Classification Search
CPC .. A47B 95/00; E05D 5/02; E05D 5/08; E05D 5/0215; E05D 5/0223; E05D 5/0238;
(Continued)

(56) References Cited

U.S. PATENT DOCUMENTS 4,185,357 A * 1/1980 Busse ........................ E05D 5/08 16/265
4,799,290 A 1/1989 Lautenschläger, Jr.
(Continued)

FOREIGN PATENT DOCUMENTS

EP 1 895 082 3/2008
JP 57-199676 12/1982
(Continued)

OTHER PUBLICATIONS

International Search Report issued Jan. 2, 2023 in International (PCT) Application No. PCT/AT2022/060354.

*Primary Examiner* — Chuck Y Mah
(74) *Attorney, Agent, or Firm* — Wenderoth, Lind & Ponack, L.L.P.

(57) ABSTRACT

A fitting includes a first fitting portion to be fixed to a panel of a carrier, and a second fitting portion to be fixed to a pivoting element and pivotally connected to the first fitting portion. The first fitting portion includes a mounting member having a fastening device for fixing the mounting member to the panel of the carrier, and the first fitting portion includes a coupling member hingedly connected to the second fitting portion. The coupling member is releasably connected to the mounting member, and the mounting member of the first fitting portion includes a housing. The coupling member, in a connected condition with the mounting member, is received within the housing. A locking device can releasably lock the coupling member to the mounting member, and includes an ejection device for ejecting the coupling member out of the housing during unlocking.

22 Claims, 9 Drawing Sheets

(58) Field of Classification Search

CPC ......... E05D 5/0276; E05D 5/046; E05D 5/16; E05D 7/0009; E05D 7/10; E05D 7/12; E05D 7/125; E05D 7/123; E05D 7/1061; E05D 2007/128; E05D 2007/1094; E05D 11/1021; E05D 11/1007; E05Y 2900/20

See application file for complete search history.

(56) References Cited

U.S. PATENT DOCUMENTS

| | | | | |
|---|---|---|---|---|
| 6,081,970 | A * | 7/2000 | Wasilewski ............. | E05D 7/125 16/383 |
| 7,552,511 | B2 * | 6/2009 | Campbell ................. | E05D 7/12 16/236 |
| 8,997,402 | B2 | 4/2015 | Mao | |
| 10,407,963 | B2 * | 9/2019 | Salice ................... | E05D 7/0415 |
| 11,306,527 | B2 | 4/2022 | Folie et al. | |
| 11,486,176 | B2 | 11/2022 | Duer | |
| 2010/0101054 | A1 * | 4/2010 | Cook ........................ | E05D 5/04 16/382 |
| 2015/0061481 | A1 | 3/2015 | Mao | |
| 2019/0316397 | A1 * | 10/2019 | Kruedener .............. | E05D 15/46 |
| 2021/0087867 | A1 | 3/2021 | Folie et al. | |
| 2021/0115714 | A1 | 4/2021 | Duer | |
| 2021/0148149 | A1 * | 5/2021 | Pleuteri ................. | E05D 5/0276 |

FOREIGN PATENT DOCUMENTS

| | | |
|---|---|---|
| JP | 62-68981 | 3/1987 |
| JP | 3-172476 | 7/1991 |
| JP | 2007-309004 | 11/2007 |
| JP | 2021-529274 | 10/2021 |
| JP | 2021-529904 | 11/2021 |
| WO | 2020/006588 | 1/2020 |
| WO | 2020/006589 | 1/2020 |

* cited by examiner

FITTING FOR THE MOVABLE MOUNTING OF A PIVOT ELEMENT RELATIVE TO A STATIONARY SUPPORT

The present application is a continuation of International Application PCT/AT2022/060354 filed on Oct. 13, 2022. Thus, all of the subject matter of International Application PCT/AT2022/060354 is incorporated herein by reference.

BACKGROUND OF THE INVENTION

The present invention relates to a fitting for movably supporting a pivoting element, in particular a furniture part, a door or a window, relative to a stationary carrier. The fitting comprises:

- a first fitting portion configured to be fixed to a, preferably substantially horizontally aligned, panel of the carrier,
- a second fitting portion configured to be fixed to the pivoting element, the second fitting portion being pivotally connected to the first fitting portion,
- wherein the first fitting portion includes a mounting member having at least one fastening device for fixing the mounting member to the panel of the carrier, and that the first fitting portion includes at least one coupling member hingedly connected to the second fitting portion, the at least one coupling member being configured to be releasably connected to the mounting member,
- wherein the mounting member of the first fitting portion includes a, preferably pocket-shaped, housing, wherein the coupling member, in a connected condition with the mounting member, is at least partially, preferably for the most part (i.e., more than 50%), received within the housing of the mounting member,
- at least one locking device for releasably locking the coupling member to the mounting member,
- wherein the at least one locking device includes an ejection device for at least partially ejecting the coupling member out from the housing of the mounting member in the course of an unlocking operation.

Moreover, the invention concerns a method for movably supporting a pivoting element, in particular a furniture part, a door or a window, on a stationary carrier with the aid of at least one fitting of the type to be described.

WO 2020/006588 A1 and WO 2020/006589 A1 each disclose furniture fittings for movably supporting a pivoting element in the form of a furniture door. The carcass-sided fitting portion, for fixing to the stationary carrier, includes a mounting member configured to be integrated into a furniture panel. In a first step, the mounting member is to be pre-mounted to or within the furniture panel. In a second step, the furniture door can be releasably connected via a coupling member to the pre-mounted mounting member. For mounting the coupling member, the latter is inclinedly inserted into the pocket-shaped mounting member, and a locking portion of the coupling member is guidable along an inclined surface of a locking element so as to load a force storage member. Subsequently, the locking portion can enter into a recess of the locking element, whereby the force storage member is discharged and the coupling member is lockable to the mounting member. For unlocking the coupling member from the mounting member, a release element is provided which can be pushed-in by a tool. By pushing the release element, the locking portion is movable, against a force of the force storage member, in a direction extending parallel to a front face of the mounting member, until the locking portion of the coupling member is released and the coupling member can be separated from the mounting member.

EP 1 895 082 A2 shows a furniture hinge with a skeletal-shaped connecting element which can be releasably locked to a door-sided connecting element.

US 2015/061481 A1 discloses a cabinet with a pivotable door which can be ejected from the closed position into an open position by a Touch-Latch mechanism. The Touch-Latch mechanism can be unlocked by an over-pressing movement of the door in the closed position, and a component to be connected to the door is ejectable, by a force of a compression spring, from a holder to be fixed to the cabinet. The ejection operation is triggered upon each over-pressing movement of the door, and this is not desired for some applications. For example, it is possible that the door is also inadvertently triggered, for example by mere leaning of person against the door or by playing children.

SUMMARY OF THE INVENTION

It is an object of the present invention to propose a fitting of the type mentioned in the introductory part, having an improved unlocking possibility.

According to the invention, a release device with a movably-supported release element for releasing the locking between the mounting member and the coupling member is provided.

In this way, the locking between the mounting member and the coupling member is releasable by a deliberately performed actuation of the movably-supported release element, and an inadvertent release of the locking can be prevented.

The coupling member is insertable into the mounting member in an assembling direction. The coupling member, from a coupled condition with the mounting member, can be actively ejected out from the mounting member by the ejection device, that is to say at least over a region in a direction opposite the assembling direction.

This facilitates the demounting of the pivoting element from the stationary carrier, in particular when two or more fittings are provided for movably supporting the pivoting element. The danger of a jamming between the mounting member and the coupling member can be thereby reduced, and the separation of the coupling member from the mounting member can be facilitated.

According to an embodiment, the housing of the mounting member includes a front face, and the coupling member is insertable into the housing of the mounting member in a direction extending perpendicular to the front face when mounted.

In other words, the coupling member can be inserted into the mounting member by a straight assembling movement, and can be locked in a defined end position. In contrast, with the prior art according to the WO 2020/006588 A1 reference mentioned in the introductory part, the coupling member, with the furniture part fixed thereon, must be inclinedly introduced into the housing of the mounting member. This has the drawback that the maximum wall thickness of the pivoting element is thereby limited, because the pivoting element, when the coupling member is mounted, abuts against the furniture carcass or that the coupling member cannot be introduced into the housing of the mounting member at all. The straight insertion of the coupling member into the housing of the mounting member provides a mounting largely independently from the material thickness of the pivoting element.

According to the invention, the housing of the mounting member includes a front face, and the locking between the mounting member and the coupling member takes place in a region adjacent to the front face. This has the advantage that the occurring forces, upon a movement of the pivoting element, are directly introduced into the carrier, and that the coupling member can be stably connected to the mounting member.

BRIEF DESCRIPTION OF THE DRAWINGS

Further details and advantages of the present invention result from the following description of figures, in which.

DETAILED DESCRIPTION OF THE INVENTION

Figure 1:
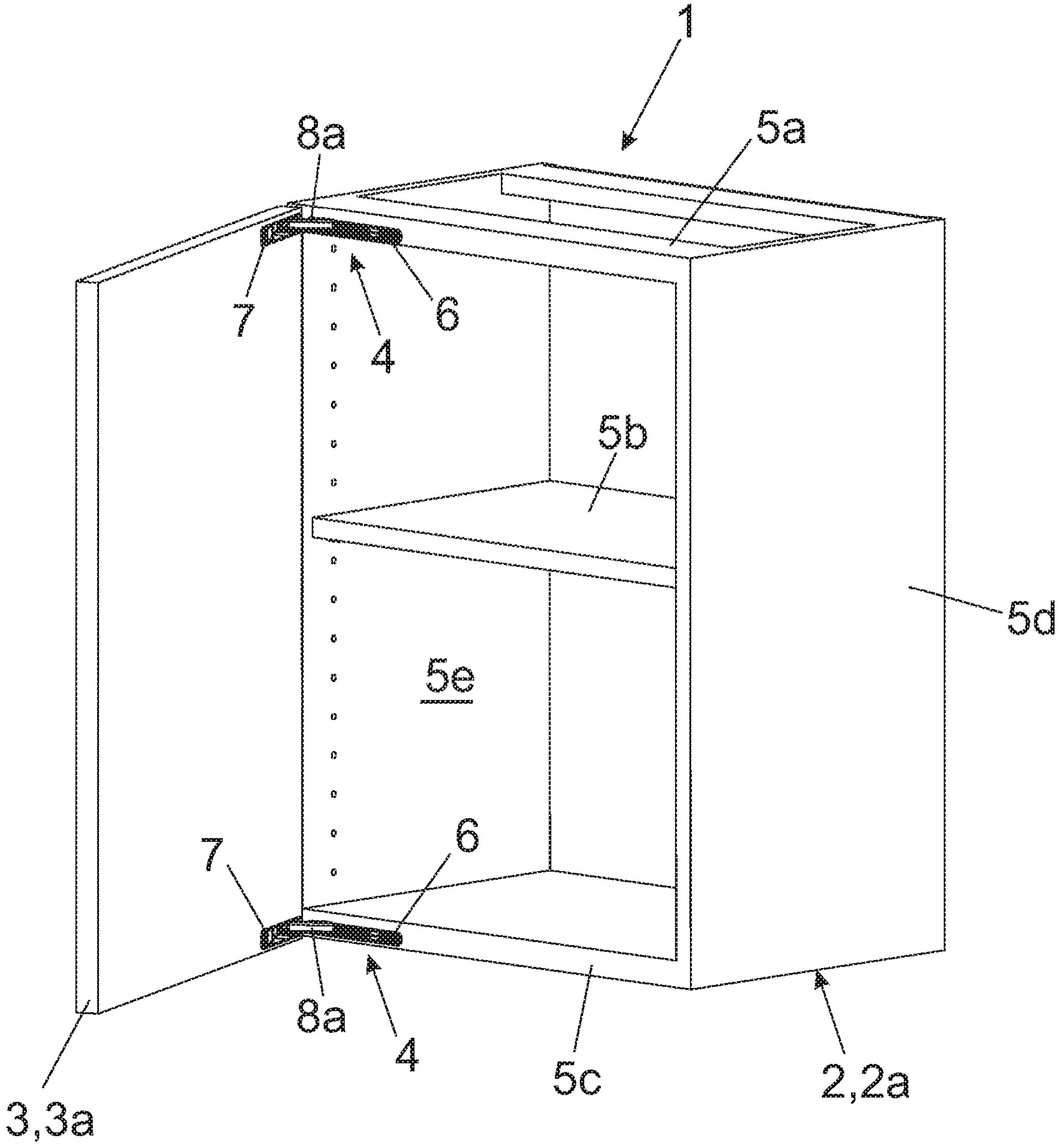
FIG. 1 is a perspective view of an item of furniture with a carrier and with a pivoting element movable relative to the carrier.

FIG. 1 shows a perspective view of an item of furniture 1 with a stationary carrier 2 (for example in the form of a furniture carcass 2*a*), in which a pivoting element 3 (for example a movable furniture part 3*a*, a flap, a door, a window or the like) is pivotally supported by at least one fitting 4 relative to the carrier 2 about an axis. Preferably, the axis extends vertically in a mounted position.

The carrier 2 includes a plurality of panels 5*a*-5*e*, and the first fitting portion 6 of the fitting 4 is configured to be integrated into one of the panels 5*a*-5*e* of the carrier 2 (thus within the top panel, within the bottom panel and/or within a shelf arranged between the top panel and the bottom panel).

Of course, it is also possible to arrange the fitting 4 within or to one of the vertically extending panels 5*d*, 5*e*, so that the pivoting element 3 is pivotally supported relative to the carrier 2 about a horizontally extending axis in a mounted condition.

In the shown embodiment, the first fitting portion 6 of the fitting 4 is substantially entirely received within a recess of the panels 5*a*, 5*c*, whereas the second fitting portion 7 of the fitting 4 is substantially entirely received within a further recess of the pivoting element 3.

The pivoting element 3 can be formed of a panel-shaped material (for example wood, plastic, fiberboard, a glass panel or the like).

Figure 2:
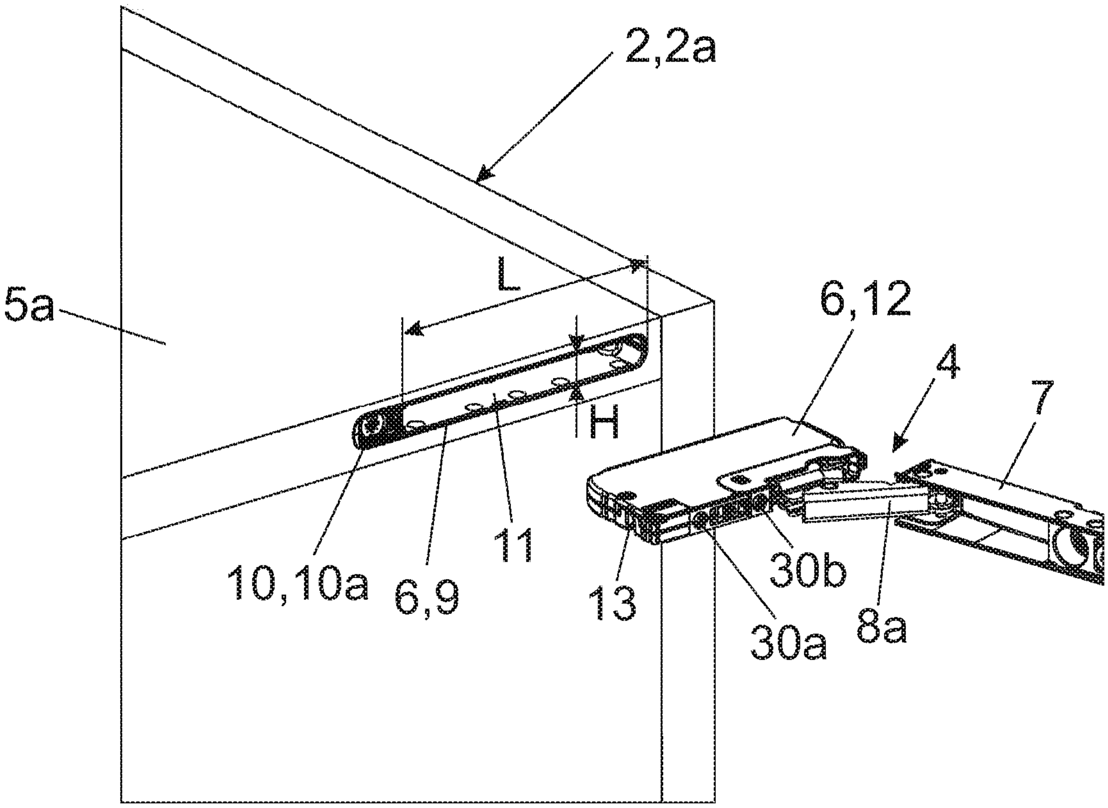
FIG. 2 shows the carrier and the fitting in a separated condition.

FIG. 2 shows the carrier 2 and the fitting 4 in a separated condition from each other. The first fitting portion 6 is to be fixed to or within a panel 5*a*-5*e* of the carrier 2. For this purpose, the first fitting portion 6 includes a mounting member 9 configured to be inserted into a recess of the panel 5*a*, and is fixable to the panel 5*a* via at least one fastening device 10.

The fastening device 10 can be realized according to different embodiments and can include, for example, at least one hole for the passage of a screw, at least one eccentric or at least one clamping screw. In the shown embodiment, the fastening device 10 includes at least one movable fastening element 10*a*. By an actuation of the fastening element 10*a* with the aid of a tool, at least one clamping portion 31 (FIG. 9) of the fastening device 10 can be connected to the panel 5*a* in a frictionally locked manner.

In a first step, the mounting member 9 is to be pre-mounted to the panel 5*a* via the fastening device 10. The mounting member 9 includes a, preferably pocket-shaped, housing 11, and a coupling member 12 of the first fitting portion 6 can be introduced into the housing 11 and can be releasably locked within the housing 11 via at least one locking device 13.

The coupling member 12 of the first fitting portion 6 is pivotally connected to the second fitting portion 7 via at least one hinge lever 8*a*. The second fitting portion 7 can be configured to be at least partially, preferably substantially entirely, countersunk within a recess of the pivoting element 3. Alternatively, the second fitting portion 7 can be arranged entirely outside a wall thickness of the pivoting element 3 in a mounted condition.

The housing 11 of the mounting member 9 includes a longitudinally-shaped recess for receiving the coupling member 12. The housing 11 has a height extension (H) and a longitudinal extension (L), and the longitudinal extension (L) can be at least three times, preferably at least six times, larger than the height extension (H).

The, preferably substantially cuboidal, coupling member 12 has a dimensioning corresponding to the height extension (H) and to the longitudinal extension (L), and the coupling member 12 is configured to be received within the housing 11 of the mounting member 9 approximately in a form-locking manner.

Figure 3:
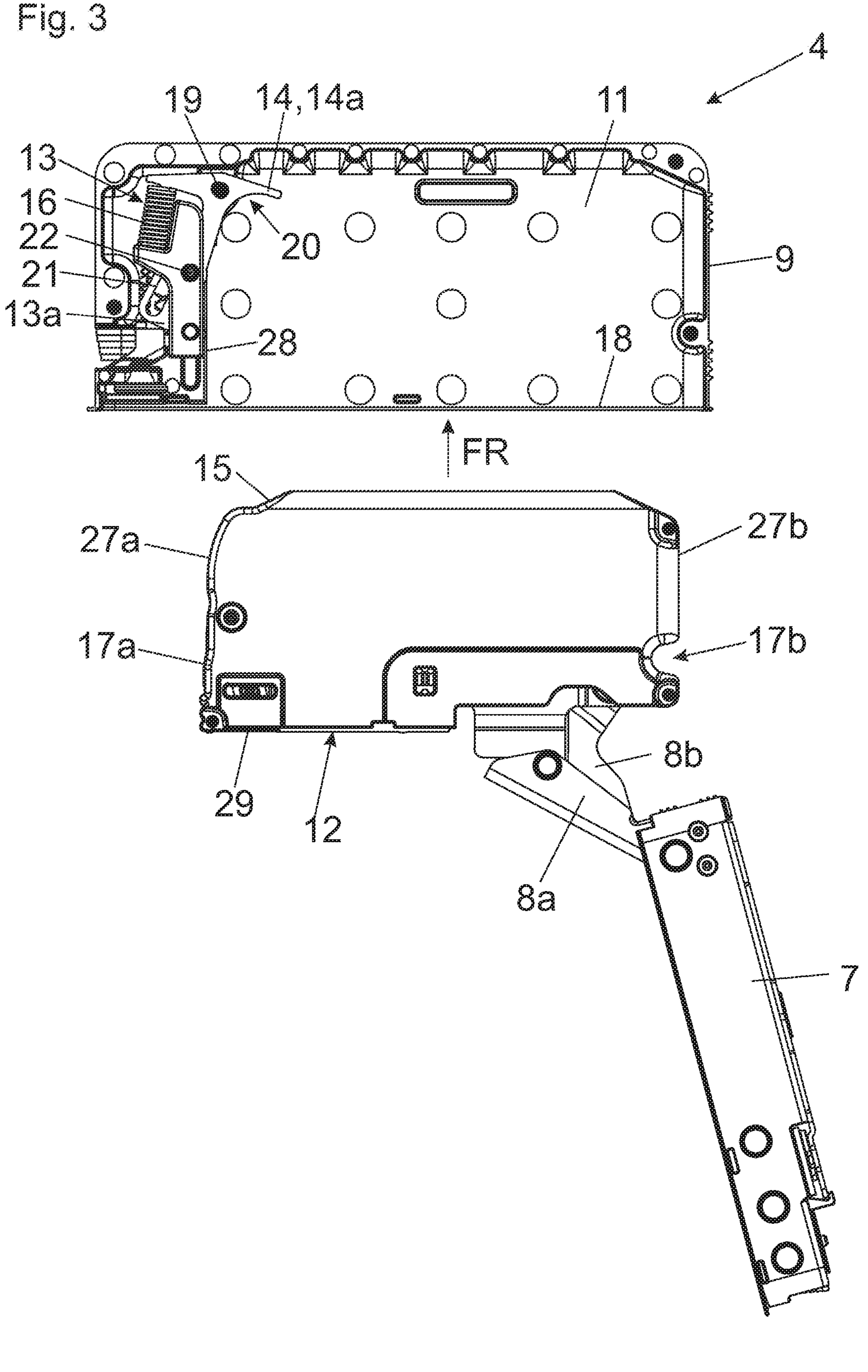
FIG. 3 shows the mounting member and the coupling member of the first fitting portion in a separated condition from each other.

FIG. 3 shows the mounting member 9 and the coupling member 12 of the first fitting portion 6 in a separated condition from each other.

By at least one locking device 13, the coupling member 12 is releasably lockable to the mounting member 9. The at least one locking device 13 includes an ejection device 14 for at least partially ejecting the coupling portion 12 out from the housing 11 of the mounting member 9 in the course of an unlocking operation.

The coupling member 12, when being mounted, is insertable into the housing 11 of the mounting member 9 in an assembling direction (FR), and the coupling member 12 can be ejected at least over a region in a direction opposite the assembling direction (FR) in the course of the unlocking operation.

The housing 11 of the mounting member 9 can include a front face 18, and the coupling member 12, when being mounted, is insertable into the housing 11 of the mounting member 9 in a direction extending substantially perpendicular to the front face 18. The front face 18 of the housing 11, in a mounted condition, extends substantially parallel to a front narrow side of the panel 5*a* of the carrier 2.

The coupling member 12 can include a rear side 15, and the ejection device 14 is operative onto (engages) the rear side 15 of the coupling member 12 during the unlocking operation, and can preferably bear against the rear side 15. Preferably, the ejection device 14 is configured to bear against a recess of the coupling member 12, the recess being arranged on the rear side 15 of the coupling member 12.

In the shown embodiment, at least one anchor 20 pivotable about a pivoting axis 19 is provided. The anchor 20 includes a shaft and two arms protruding from the shaft. The spring element 16 engages on a first arm of the anchor 20, the ejection lever 14*a* is arranged on a second arm of the anchor 20, and the locking lever 13*a* is arranged on the shaft of the anchor 20.

The locking device 13 can include at least one pivotable locking lever 13*a* for releasably locking the coupling portion 12. Preferably, the at least one locking lever 13*a*

- has a locking position and an unlocking position, and the at least one locking lever 13*a*, for mounting the coupling member 12, is arranged in the unlocking position, and/or
- is pre-stressed by at least one spring element 16, preferably a helical spring, preferably the at least one locking lever 13*a*, when the coupling member 12 is inserted into the housing 11 of the mounting member 9, is movable against a force of the spring element 16, and can be releasably locked to the coupling member 12 upon a continued insertion movement into the housing 11, and/or
- is configured to be releasably locked via a control curve 21 and a control element 22, preferably a cylindrical pin, movable along the control curve 21, and/or
- is configured to be releasably locked to at least one recess 17*a*, 17*b* of the coupling member 12, and/or
- is arranged in or on the mounting member 9 of the first fitting portion 6.

According to preferred embodiments, the coupling member 12

- is received with a lateral play within the housing (11) of the mounting member (9) when the coupling member (12) is in an inserted condition within the housing (11) of the mounting member (9) and when the locking device (13) is located in an unlocking position, and/or
- includes at least one sidewall 27*a* and the housing 11 of the mounting member 9 includes a lateral wall 28 for guiding the at least one sidewall 27*a* of the coupling member 12 when mounted, preferably the at least one sidewall 27*a* of the coupling member 12 and the lateral wall 28 of the housing 11, in a locked position of the coupling member 12, are spaced apart from each other, preferably in a direction extending transversely to an assembling direction (FR) of the coupling member 12, and/or
- includes two opposing sidewalls 27*a*, 27*b*, and at least one recess 17*a*, 17*b* for releasably locking the coupling member 12 to the housing 11 of the mounting member 9 is arranged on each of the two opposing sidewalls 27*a*, 27*b*, and/or
- includes at least one recess 17*a*, 17*b* for locking the coupling member 12 to the mounting member 9, preferably the at least one recess 17*a*, 17*b* is arranged adjacent to a front face 18 of the coupling member 12, and/or
- is pivotally connected to the second fitting portion 7 via at least one hinge lever 8*a*, preferably via at least two hinge levers 8*a*, 8*b*, and/or
- includes at least one adjustment device 30*a*, 30*b* (FIG. 2) for adjusting a position of the coupling member 12 relative to the mounting member 9, and/or
- has a height extension (H) and a longitudinal extension (L), and the longitudinal extension (L) is at least three times, preferably at least six times, larger than the height extension (H).

According to preferred embodiments, the housing 11 of the mounting member 9

- is configured such that the housing 11 can be substantially entirely integrated within the panel 5*a*-5*e* of the carrier 2, and/or
- has a height extension (H) and a longitudinal extension (L), and the longitudinal extension (L) of the housing 11 of the mounting member 9 is at least three times, preferably at least six times, larger than the height extension (H), and/or
- includes the locking device 13 and the ejection device 14.

Figure 4:
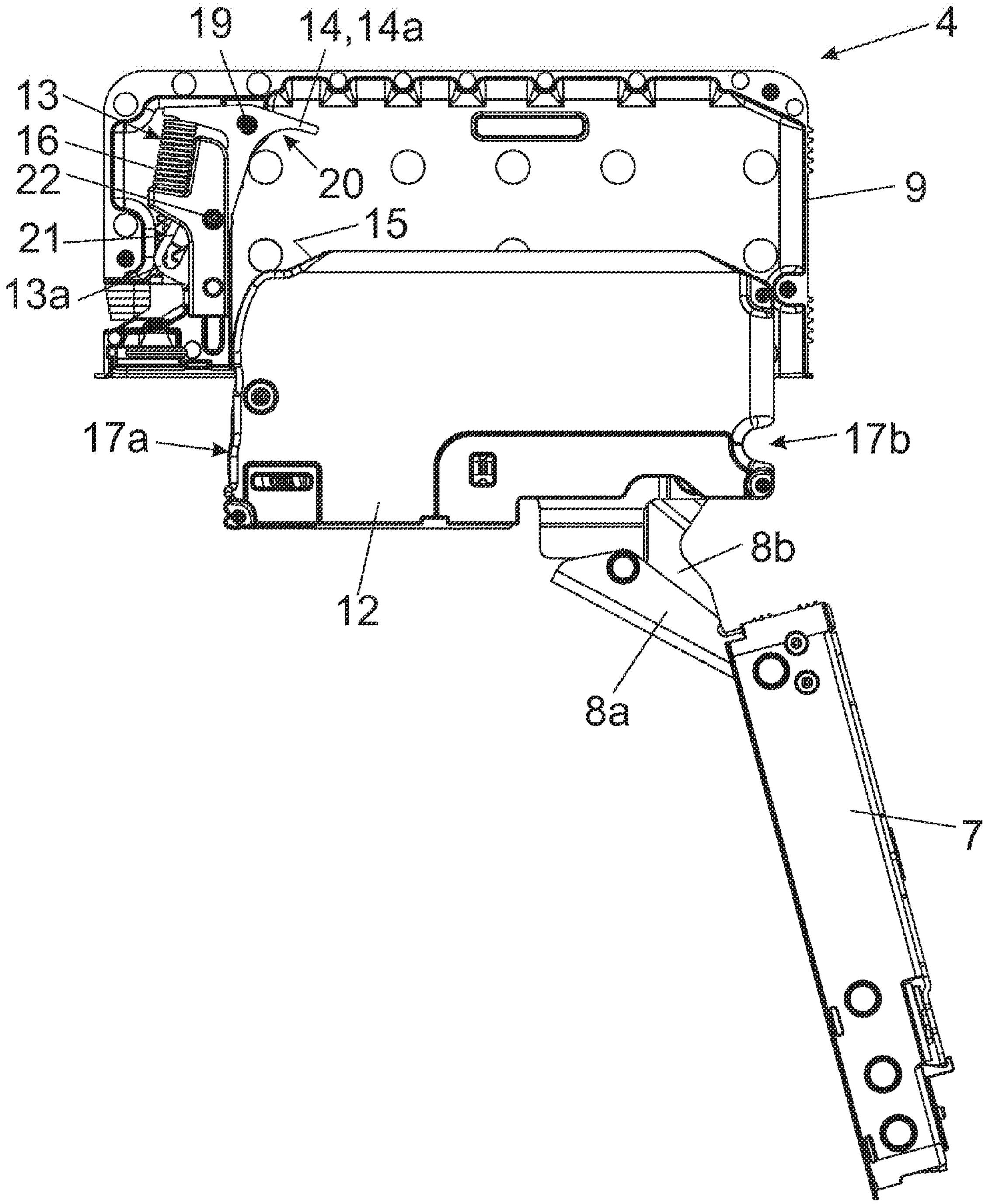
FIG. 4 shows the coupling portion partially inserted into the mounting member.

FIG. 4 shows the coupling member 12 which is partially inserted into the mounting member 9 of the first fitting portion 6. The locking device 13 includes at least one pivotable locking lever 13*a* for releasably locking the coupling member 12. The ejection device 14 includes at least one ejection lever 14*a* for ejecting the coupling member 12 out from the housing 11 of the mounting member 9, preferably wherein

- the at least one locking lever 13*a* and the at least one ejection lever 14*a* are formed together so as to have an integral one-piece configuration, and/or
- the at least one locking lever 13*a* and the at least one ejection lever 14*a* are pre-stressed by a same spring element 16, and/or
- at least one pivotally supported anchor 20 having a shaft and two arms protruding from the shaft is provided, wherein a spring element 16 engages on a first arm of the anchor, the ejection lever 14*a* is arranged on a second arm of the anchor 20, and the locking lever 13*a* is arranged on the shaft of the anchor 20, and/or
- the at least one locking lever 13*a* and the at least one ejection lever 14*a* are arranged on the mounting member 9 of the first fitting portion 6.

Figure 5:
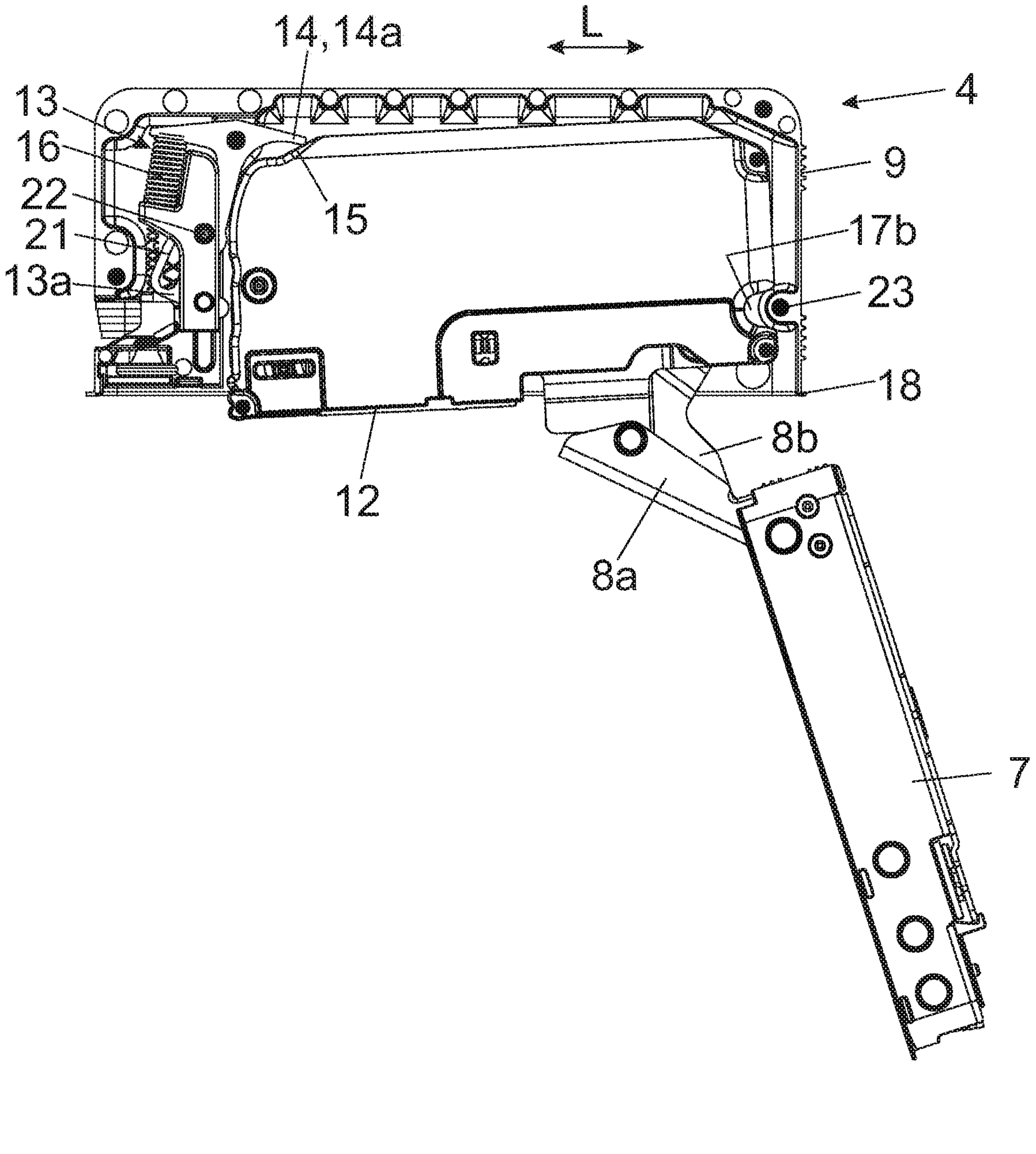
FIG. 5 shows a continued insertion movement of the coupling member into the mounting member.

FIG. 5 shows a continued insertion movement of the coupling member 12 into the mounting member 9 premounted to the carrier 2. The coupling member 12 can have at least one lateral recess 17*b* configured to be engaged with an engagement element 23 arranged on the mounting member 9. For example, the engagement element 23 can be in the form of a protrusion, as a cylindrical pin or as a rotatably supported roller, the rotational axis of the roller extending substantially parallel to the height extension (H) of the mounting member 9. In FIG. 5, it can also be seen that the rear side 15 of the coupling member 12 contacts the ejection lever 14*a*.

Figure 6:
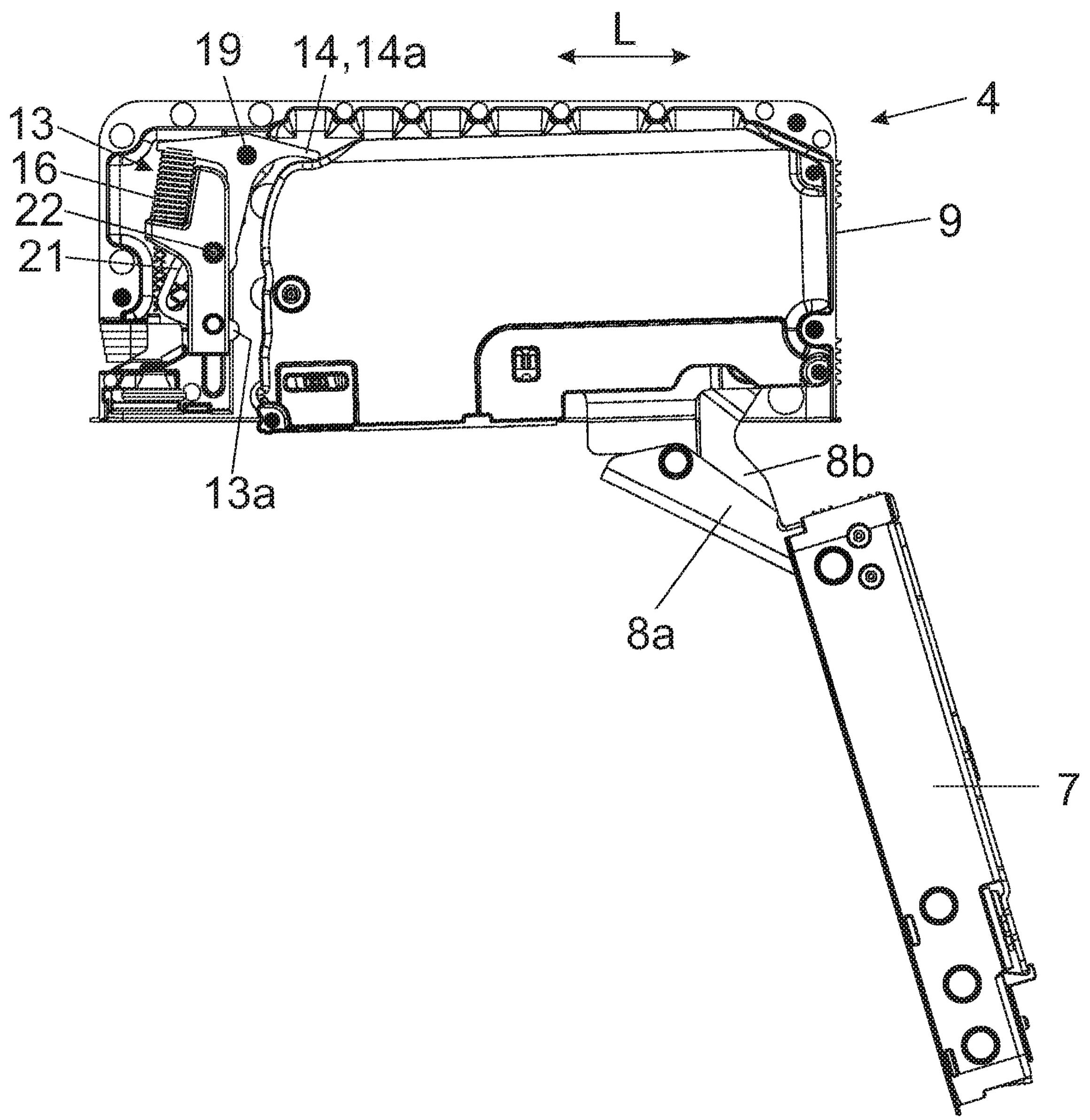
FIG. 6 shows a continued insertion movement of the coupling member into the mounting member.

FIG. 6 shows that the recess 17*b* of the coupling member 12 can be engaged with the engagement element 23 of the mounting member 9 by a slight movement of the coupling portion 12 in a direction of the longitudinal extension (L).

Figure 7:
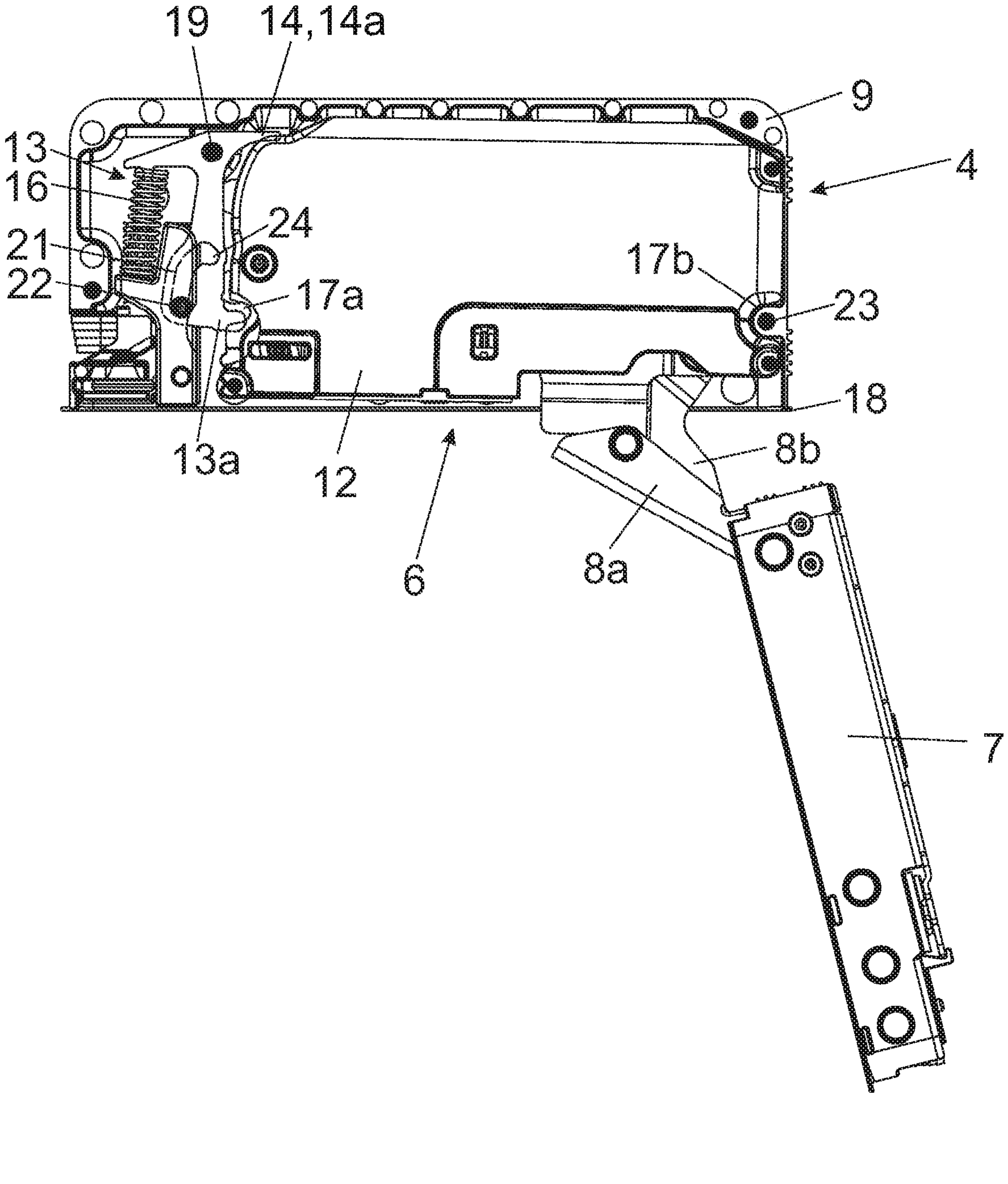
FIG. 7 shows the locked condition between the coupling member and the mounting member.

FIG. 7 shows the locked position between the coupling member 12 and the mounting member 9. Starting from FIG. 6, the coupling member 12 has further been pushed into the housing 11 of the mounting member 9. As a result, the control element 22 (for example a cylindrical pin) has been moved out from a locking recess 24 of the control curve 21. In this way, the locking lever 13*a* is moved about the pivoting axis 19 by a force of the relaxing spring element 16, and is locked into the lateral recess 17*a* of the coupling member 12.

It can be seen that the locking lever 13*a* of the locking device 13 and the ejection lever 14*a* of the ejection device 14 are formed together so as to have an integral one-piece configuration, and are preferably pre-stressed by a same, single spring element 16.

Figure 8:
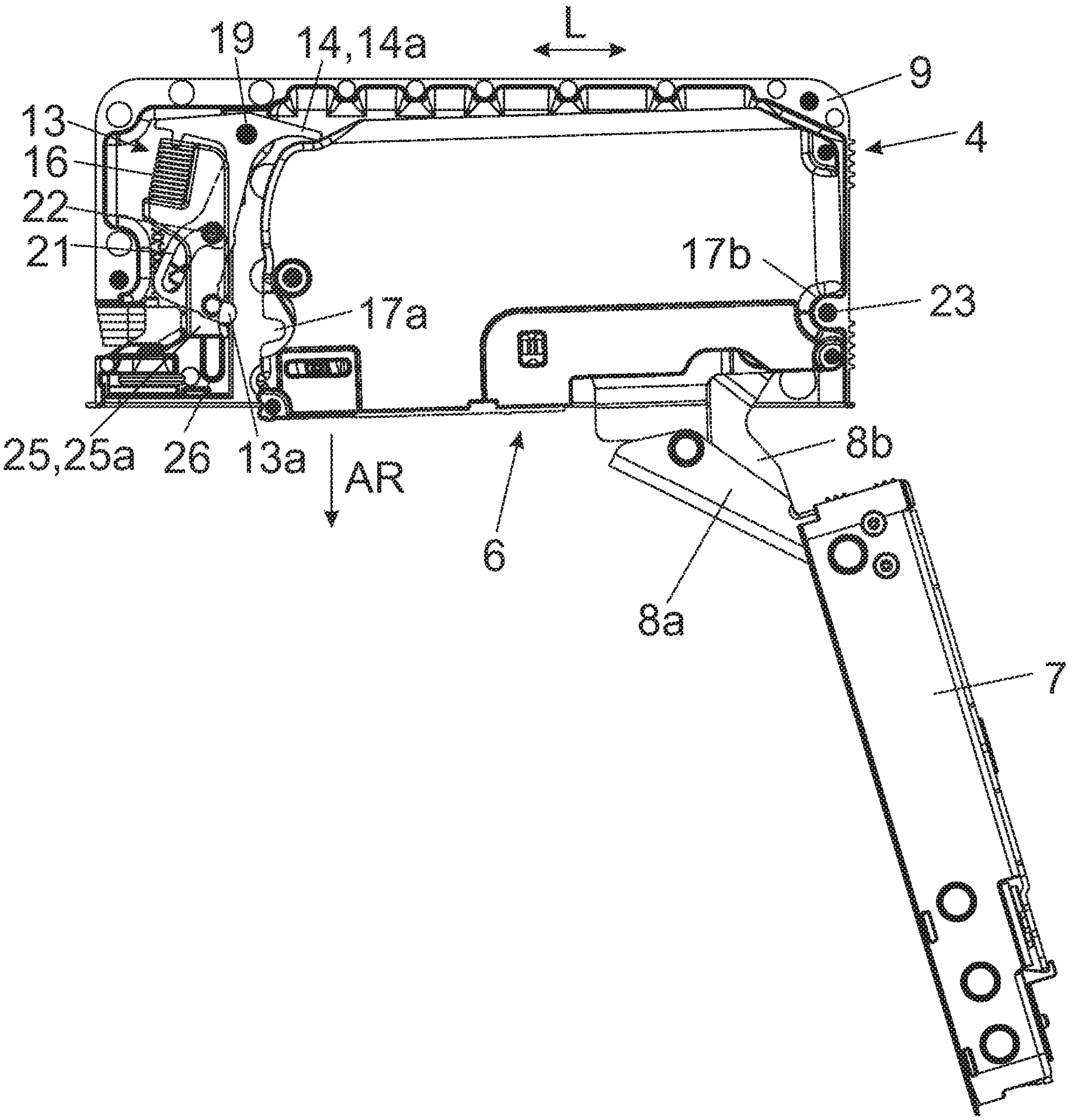
FIG. 8 shows the ejection operation of the coupling member out from the mounting member.

FIG. 8 shows the release of the locking between the coupling member 12 and the mounting member 9 and the ejection operation of the coupling member 12 out from the housing 11 of the mounting member 9 in an ejection direction (AR).

The locked position between the coupling member 12 and the mounting member 9 can be again released by a release device 25 having a movable release element 25*a*. Preferably, the release element 25*a*

- is linearly displaceably supported, and/or
- is configured to be actuated by a tool, and/or
- is movable against a force of a spring element 16 into a release position in which the coupling member is released, and/or
- is movable along at least one guide 26, and/or
- is movable in a direction extending perpendicular to a front face 18 of the mounting member 9 and/or is configured to be actuated from a front face 18 of the mounting member 9.

For releasing the locking, the release element 25*a* is pushed into the housing 11 of the mounting member 9 with the aid of a tool. As a result, the control element 22 is moved against the force of the spring element 16 along the control curve 21 and the spring element 16 is tensioned.

Due to the movement of the control element 22 along the control curve 21, the locking lever 13*a* of the locking device 13 is also moved out from the recess 17*a* of the coupling member 12, and the ejection lever 14*a* of the ejection device 14 is tilted about the pivoting axis 19. Eventually, the control element 22 again jumps into the locking recess 24 of the control curve 21, whereby the coupling member 12 is ejectable out from the housing 11 of the mounting member 9 in the ejection direction (AR) by the ejection lever 14*a* and by the force of the relaxing spring element 16.

In the shown FIG. 8, at least one guide 26 for linearly guiding the release element 25*a* is provided. By the at least one guide 26, the release element 25*a* can be guided in a direction extending perpendicular to the front face 18.

The method for movably supporting a pivoting element 3, in particular a movably-supported furniture part 3*a*, a door or a window, on a stationary carrier 2 with the aid of at least one fitting 4 of the described type includes the following method steps:

- fixing the mounting member 9 of the first fitting portion 6 to or on a, preferably substantially horizontally aligned, panel 5*a*-5*e* of the carrier 2,
- fixing the second fitting portion 7 to the pivoting element 3,
- introducing the coupling member 12 hingedly connected to the second fitting portion 7 into the, preferably pocket-shaped, housing 11 of the mounting member 9 of the first fitting portion 6,
- releasably locking the coupling member 12 to the housing 11 of the mounting member 9 with the aid of the locking device 13, and
- ejecting the coupling member 12 at least partially out from the housing 11 of the mounting member 9 by the ejection device 14 in the course of an unlocking operation.

According to a preferred embodiment of the method, the coupling member 12 is introduced in a direction extending substantially perpendicular to a front face 18 of the housing 11 of the mounting member 9. Preferably, the coupling member 12, shortly before reaching an end position within the housing 11, is moved in a direction extending substantially parallel to the front face 18 of the housing 11 of the mounting member 9.

Figure 9:
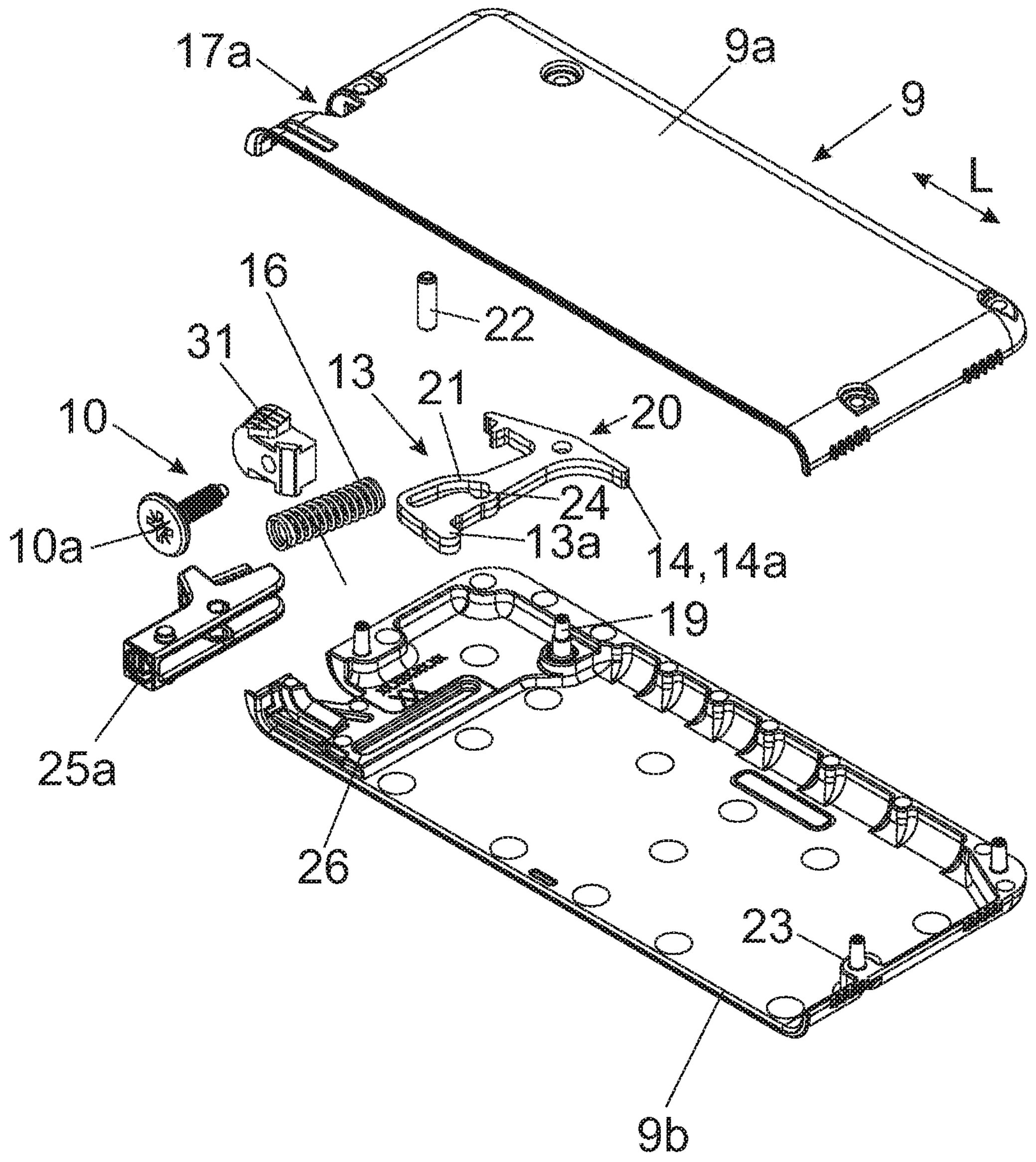
FIG. 9 shows the mounting member in an exploded view.

FIG. 9 shows the mounting member 9 of the first fitting portion 6 in an exploded view. The mounting member 9 includes two housing portions 9*a*, 9*b* configured to be connected to each other, and the locking device 13 with the locking lever 13*a* and the ejection device 14 are arranged between the two housing portions 9*a*, 9*b*. To be seen is the anchor 20 on which the spring element 16 engages and on which the locking lever 13*a* and the ejection lever 14*a* are commonly arranged.

The control curve 21 for guiding the control element 22 is formed or arranged on the anchor 20. The control curve 21 includes a locking recess 24 for releasably locking the locking lever 13*a* in the unlocking position.

The mounting member 9 is to be fixed to a panel 5*a*-5*e* of the carrier 2 via at least one fastening device 10. The fastening device 10 can include a fastening element 10*a* and a clamping portion 31 configured to be driven by the fastening element 10*a*, and the mounting member 9 is fixable within a panel 5*a*-5*e* of the carrier 2 by the clamping portion 31.

The invention claimed is:

1. A fitting for movably supporting a pivoting element relative to a stationary carrier, the fitting comprising:
- a first fitting portion configured to be fixed to a panel of the carrier,
- a second fitting portion configured to be fixed to the pivoting element, the second fitting portion being pivotally connected to the first fitting portion,
- wherein the first fitting portion includes a mounting member having a fastening device for fixing the mounting member to the panel of the carrier, and the first fitting portion includes a coupling member hingedly connected to the second fitting portion, the coupling member being releasably connected to the mounting member,
- wherein the mounting member of the first fitting portion includes a housing, wherein the coupling member, in a connected condition with the mounting member, is at least partially received within the housing of the mounting member,
- wherein the fitting further comprises:
  - a locking device for releasably locking the coupling member to the mounting member, the locking device including an ejection device for at least partially ejecting the coupling member out from the housing of the mounting member in the course of an unlocking operation, and
  - a release device with a movably-supported release element for releasing the locking between the mounting member and the coupling member.

2. The fitting according to claim 1, wherein the coupling member is insertable into the housing of the mounting member in an assembling direction during mounting, wherein the coupling member is ejectable by the ejection device in a direction opposite the assembling direction during the unlocking operation.

3. The fitting according to claim 1, wherein the housing of the mounting member includes a front face, and the coupling member is insertable into the housing of the mounting member in a direction extending substantially perpendicular to the front face during mounting.

4. The fitting according to claim 1, wherein the housing of the mounting member includes a front face, and the locking between the mounting member and the coupling member occurs in a region adjacent to the front face.

5. The fitting according to claim 1, wherein the coupling member includes a rear side, and the ejection device engages the rear side of the coupling member during the unlocking operation.

6. The fitting according to claim 5, wherein the ejection device is configured to bear against the rear side of the coupling member.

7. The fitting according to claim 1, wherein the locking device includes a pivotable locking lever for releasably locking the coupling member.

8. The fitting according to claim 7, wherein the pivotable locking lever has at least one of the following configurations:

has a locking position and an unlocking position, and the pivotable locking lever is arranged in the unlocking position to mount the coupling member, is pre-stressed by a helical spring, and the locking lever is movable against a force of the spring element when the coupling member is inserted into the housing of the mounting member, and is releasably lockable to the coupling member upon a continued insertion movement into the housing, is releasably lockable via a control curve and a control element formed as a pin movable along the control curve, is releasably lockable to a recess of the coupling member, and is arranged in or on the mounting member of the first fitting portion.

9. The fitting according to claim 1, wherein the ejection device includes a pivotable ejection lever for ejecting the coupling member.

10. The fitting according to claim 9, wherein the pivotable ejection lever has at least one of the following configurations:

is operative on a rear side of the coupling member during the unlocking operation, is pre-stressed by a spring element, is formed together with a locking lever of the locking device to have an integral one-piece configuration, and is arranged within or on the mounting member of the first fitting portion.

11. The fitting according to claim 1, wherein the locking device includes a pivotable locking lever for releasably locking the coupling member, and the ejection device includes an ejection lever for ejecting the coupling member out from the housing of the mounting member.

12. The fitting according to claim 11, wherein the pivotable locking lever and the ejection lever have at least one of the following configurations:

the locking lever and the ejection lever are formed together so as to have an integral one-piece configuration, the locking lever and the ejection lever are pre-stressed by a same spring element, the fitting further comprises a pivotally supported anchor, the anchor having a shaft and two arms protruding from the shaft, a spring element engages on a first arm of the anchor, the ejection lever is arranged on a second arm of the anchor, and the pivotable locking lever is arranged on the shaft of the anchor, and the pivotable locking lever and the ejection lever are arranged on the mounting portion of the first fitting portion.

13. The fitting according to claim 1, wherein the release element has at least one of the following configurations:

is linearly displaceably supported, is actuatable with the aid of a tool, is movable against a force of a spring element into a release position in which the coupling member is released, is movable along a guide, is movable in a direction extending perpendicular to a front face of the mounting member, and is actuatable from a front face of the mounting member.

14. The fitting according to claim 1, wherein the coupling member has at least one of the following configurations:

is received with a lateral play within the housing of the mounting member when the coupling member is in an inserted condition within the housing of the mounting member and when the locking device is located in an unlocking position, includes a sidewall, and the housing of the mounting member includes a lateral wall for guiding the sidewall of the coupling member when mounted, includes two opposing sidewalls, and a recess for releasably locking the coupling member to the housing of the mounting member is arranged on each of the two opposing sidewalls, and/or includes a recess for locking the coupling member to the mounting member, is pivotally connected to the second fitting portion via a hinge lever, includes an adjustment device for adjusting a position of the coupling member relative to the mounting member, and has a height extension and a longitudinal extension, and the longitudinal extension is at least three times larger than the height extension.

15. The fitting according to claim 14, wherein the coupling member has at least one of the following configurations:

includes the sidewall, and the housing of the mounting member includes the lateral wall for guiding the sidewall of the coupling member when mounted, the sidewall of the coupling member and the lateral wall of the housing being spaced apart from each other in a locked position of the coupling member in a direction extending transversely to an assembling direction of the coupling member, includes the recess for locking the coupling member to the mounting member, and the recess is arranged adjacent to a front face of the coupling member, is pivotally connected to the second fitting portion via at least two hinge levers, and has a height extension and a longitudinal extension, and the longitudinal extension is at least six times larger than the height extension.

16. The fitting according to claim 1, wherein the housing of the mounting member has at least one of the following configurations:

is configured such that the housing is substantially entirely integrated within the panel of the carrier, has a height extension and a longitudinal extension, and the longitudinal extension of the housing of the mounting member is at least three times larger than the height extension, and includes the locking device and the ejection device.

17. The fitting according to claim 16, wherein the housing of the mounting member has a height extension and a longitudinal extension, and the longitudinal extension of the housing of the mounting member is at least six times larger than the height extension.

18. A method for movably supporting a pivoting element on a stationary carrier with the aid of the fitting according to claim 1, the method comprising:

fixing the mounting member of the first fitting portion to or on a panel of the carrier, fixing the second fitting portion to the pivoting element, introducing the coupling member hingedly connected to the second fitting portion into the housing of the mounting member of the first fitting portion, releasably locking the coupling member to the housing of the mounting member with the aid of the locking device, and at least partially ejecting the coupling member out from the housing of the mounting member by the ejection device in the course of an unlocking operation.

19. The method according to claim 18, wherein the coupling member is inserted in a direction extending substantially perpendicular to a front face of the housing of the mounting member.

20. The method according to claim 19, wherein the coupling member is moved substantially parallel to a front face of the housing of the mounting member before reaching an end position within the housing.

21. A method for movably supporting the pivoting element on the stationary carrier with the aid of the fitting according to claim 18, wherein:

the pivoting element is one of a movably-supported furniture part, a door, or a window, the mounting member of the first fitting portion is fixed to or on a substantially horizontally aligned panel of the carrier, and the coupling member hingedly connected to the second fitting portion is introduced into the pocket-shaped housing of the mounting member of the first fitting portion.

22. The fitting according to claim 1, wherein:

the pivoting element is one of a furniture part, a door, or a window, the panel of the carrier is horizontally aligned, the housing is pocket-shaped, and more than 50% of the coupling member is received within the housing of the mounting member in the connected condition with the mounting member.

* * * * *